(12) United States Patent
Lew (10) Patent No.: US 9,182,109 B2
(45) Date of Patent: Nov. 10, 2015

(54) LIGHT EMITTING DEVICE ATTACHED TO IMAGE PICKUP APPARATUS

(71) Applicant: CANON KABUSHIKI KAISHA, Tokyo (JP)

(72) Inventor: Kimwei Lew, Taichung (TW)

(73) Assignee: CANON KABUSHIKI KAISHA (JP)

( * ) Notice: Subject to any disclaimer, the term of this patent is extended or adjusted under 35 U.S.C. 154(b) by 315 days.

(21) Appl. No.: 13/835,764

(22) Filed: Mar. 15, 2013

(65) Prior Publication Data

US 2013/0271944 A1  Oct. 17, 2013

(30) Foreign Application Priority Data

Apr. 13, 2012  (JP) .................................. 2012-091859
Apr. 13, 2012  (JP) .................................. 2012-091860
May 30, 2012  (JP) .................................. 2012-123076

(51) Int. Cl.
*F21V 33/00*  (2006.01)
*F21V 23/00*  (2015.01)
*G03B 15/05*  (2006.01)

(52) U.S. Cl.
CPC ........... *F21V 23/005* (2013.01); *F21V 33/0052* (2013.01); *G03B 15/05* (2013.01); *G03B 2215/0514* (2013.01)

(58) Field of Classification Search
CPC ............................... F21V 23/005; G03B 15/05
USPC .................................................... 362/3, 4, 9
See application file for complete search history.

(56) References Cited

U.S. PATENT DOCUMENTS

| 4,078,240 A | * | 3/1978 | Kaneko et al. | ................. 396/159 |
| 8,675,124 B2 | | 3/2014 | Kawakami | |
| 2013/0242525 A1 | * | 9/2013 | Yano | .................................. 362/9 |

FOREIGN PATENT DOCUMENTS

| CN | 1334485 A | 2/2002 |
| JP | 2001296586 A | 10/2001 |
| JP | 2010164838 A | 7/2010 |
| JP | 2010181552 A | 8/2010 |

OTHER PUBLICATIONS

Office Action issued in CN201310128358.8, mailed Jun. 23, 2015. English translation provided.

* cited by examiner

*Primary Examiner* — David V Bruce
(74) *Attorney, Agent, or Firm* — Rossi, Kimms & McDowell LLP

(57) ABSTRACT

A mechanism which makes it possible to space-efficiently arrange electrical components and a circuit board in a light emitting device. The light emitting device includes a light emission section and a circuit board disposed in a manner extending in a direction intersecting with an emission surface of the light emission section. A first flash circuit including a booster circuit, a second flash circuit including a high voltage circuit for causing the light emission section to emit light, and a third flash circuit including a control circuit for a digital system are mounted on the circuit board, and the third flash circuit is disposed at a location more remote from the light emission section than the first flash circuit and the second flash circuit are.

29 Claims, 8 Drawing Sheets

RELATED ART

LIGHT EMITTING DEVICE ATTACHED TO IMAGE PICKUP APPARATUS

BACKGROUND OF THE INVENTION

1. Field of the Invention

The present invention relates to a light emitting device for emitting a flash of light, and more particularly to a light emitting device that is attached to an image pickup apparatus, such as a digital camera or a digital video camera.

2. Description of the Related Art

Recent flash devices tend to be increased in circuit scale and hence also increased in space occupied by a circuit board, due to a demand for multifunctionality. On the other hand, it is becoming an important challenge to space-efficiently arrange electrical components and the circuit board, due to a demand for size reduction.

Under such circumstances, there has been proposed a technique which makes it possible to space-efficiently arrange electrical components without producing useless space within the device body of a flash device (Japanese Patent Laid-Open Publication No. 2010-181552).

Figure 13:
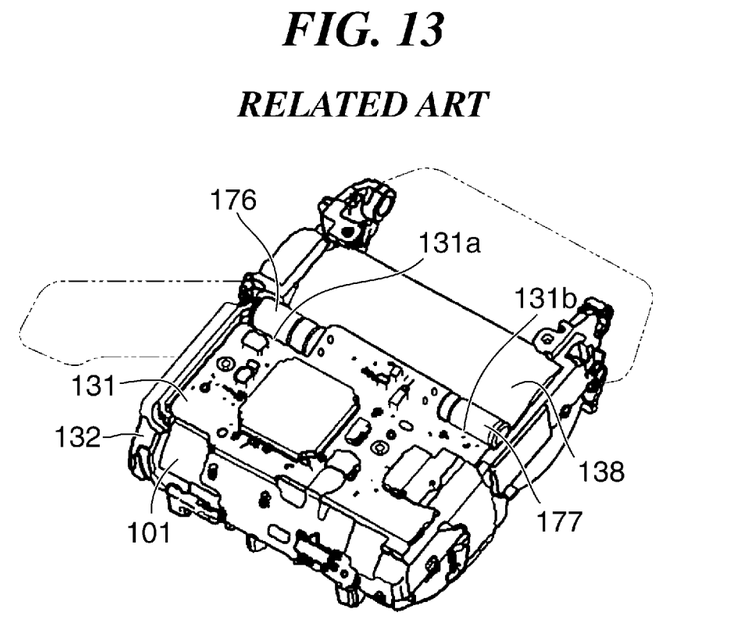
FIG. 13 is a schematic perspective view useful in explaining a conventional flash device.

As shown in FIG. 13, the flash device has the device body 101 in which cylindrical electrical components 176 and 177 are arranged in a space defined by a circuit board 131, a battery case 132, and a main capacitor 138.

The cylindrical electrical components 176 and 177 are disposed along respective cutouts 131a and 131b formed in the circuit board 131, which makes it possible to space-efficiently arrange the electrical components to thereby reduce the size of the flash device.

By the way, in a flash device, due to a demand for further size reduction and multifunctionality, space for a battery housing part the size of which is difficult to be reduced is relatively increased, but due to an increase in the number of electrical components and components of a circuit board for multifunctionality, space for housing these components becomes very small. For this reason, in accordance with reduction of the size of the flash device, noise from a light emission section is apt to enter the communication line of a control IC, causing a communication error. The communication error is apt to lead to e.g. a malfunction in which an appropriate amount of light cannot be emitted.

Further, according to the technique disclosed in Japanese Patent Laid-Open Publication No. 2010-181552, it is possible to reduce the size of a flash device, but the distance between a light emission section for emitting flash light and a circuit board on which a control IC is mounted is reduced. For this reason, the control IC is likely to be affected by noise from the light emission section during flash light emission, which is apt to cause a malfunction in which an appropriate amount of light cannot be emitted.

Furthermore, according to the technique disclosed in Japanese Patent Laid-Open Publication No. 2010-181552, when further multifunctionality of a flash device is to be realized, it is required to enlarge the scale of part for having circuits mounted thereon. Further, the number of circuit boards is increased, and accordingly, it is required to newly provide dedicated connection members, such as lead wires, wire harnesses, and relay flexible boards, for connection between the circuit boards. For this reason, in accordance with the further multifunctionality of the flash device, space for housing the circuit boards and the dedicated connection members is increased, which causes an increase in the size of the flash device, and the additional provision of the dedicated connection members causes an increase in the manufacturing costs of the flash device.

SUMMARY OF THE INVENTION

The present invention provides a mechanism that makes it possible to arrange electrical components and a circuit board, with high space efficiency, such that a malfunction caused by noise from a light emission section can be reduced, to thereby achieve size reduction and high multifunctionality of the light emitting device.

Further, the present invention provides a mechanism that makes it possible to make influence of noise from the light emission section from difficult to be received by the control section of the small-sized light emitting device.

Furthermore, the present invention provides a mechanism that makes it possible to reduce the size and costs of the light emitting device while achieving further multifunctionality of the light emitting device.

In a first aspect of the present invention, there is provided a light emitting device comprising a light emission section, and a circuit board disposed behind the light emission section in a manner extending in a direction intersecting with an emission surface of the light emission section, wherein the circuit board a first circuit including a booster circuit, a second circuit including a high voltage circuit for causing the light emission section to emit light, and a third circuit including a control circuit for a digital system, mounted thereon, and the third circuit is disposed at a location more remote from the light emission section than the first circuit and the second circuit are.

According to the first aspect of the present invention, it is possible to arrange the electrical components and the circuit board, with high space efficiency, such that a malfunction caused by noise from the light emission section can be reduced, to thereby achieve size reduction and high multifunctionality of the light emitting device.

In a second aspect of the present invention, there is provided a light emitting device comprising a light emission section, and a circuit board disposed behind the light emission section in a manner extending in a direction intersecting with an emission surface of the light emission section and having a first control section mounted thereon, wherein the circuit board is formed as a multilayer circuit board having four or more layers including a ground layer and a power supply layer formed as layers different from each other, and wherein the ground layer has a first ground pattern and a power supply ground pattern, the first ground pattern being formed on an inner layer under the first control section, and the power supply ground pattern being formed on an inner layer under electrical components of a power supply system at a location remote from the first control section.

According to the second aspect of the present invention, it is possible to make influence of noise from the light emission section difficult to be received by the control section of the small-sized light emitting device.

In a third aspect of the present invention, there is provided a light emitting device comprising a light emission section, a circuit board on which are mounted a plurality of electrical components for controlling light emission of the light emission section, contact pins configured to be electrically connected to a connection part of an external apparatus, a flexible circuit board configured to electrically connect between the contact pin and the circuit board, and a holding member disposed between the contact pins and the circuit board, the holding member including a plurality of guide portions for guiding the flexible circuit board and being configured to regulate a position of the flexible circuit board by the guide portions, wherein the flexible circuit board has a base portion fixed to an exterior member together with the contact pins, an extended portion extended from the base portion, and a connector portion formed on a front end of the extended portion for electrical connection to a connector mounted on the circuit board, and the extended portion is regulated in position by the holding member.

According to the third aspect of the present invention, it is possible to reduce the size and costs of the light emitting device while achieving further multifunctionality of the light emitting device.

In a fourth aspect of the present invention, there is provided a light emitting device comprising a light emission section, a circuit board disposed behind the light emission section in a manner extending in a first direction intersecting with an emission surface of the light emission section, a booster section configured to boost voltage applied to the light emission section so as to cause the light emission section to emit light, and a control section configured to control the light emission section, wherein the booster section and the control section are mounted on the same surface of the circuit board, wherein the booster section and the control section are disposed such that the booster section and the control section are not aligned in a second direction parallel to the emission surface of the light emission section, and wherein the control section is disposed at a location more remote from the light emission section in the first direction than the booster section is.

Further features of the present invention will become apparent from the following description of exemplary embodiments with reference to the attached drawings.

DESCRIPTION OF THE EMBODIMENTS

The present invention will now be described in detail below with reference to the accompanying drawings showing embodiments thereof.

Figure 1A:
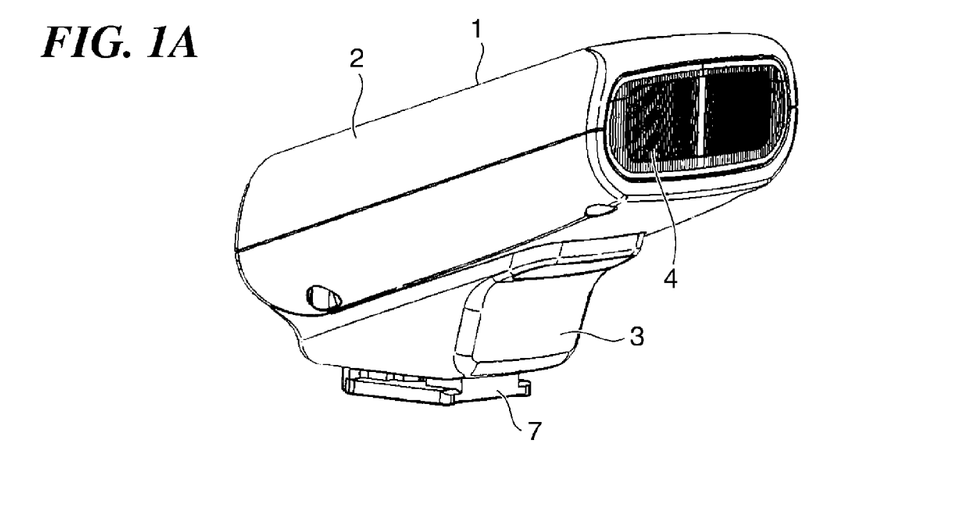
FIG. 1A is a perspective view of the appearance of a flash device as a light emitting device according to a first embodiment of the present invention.
Figure 1B:
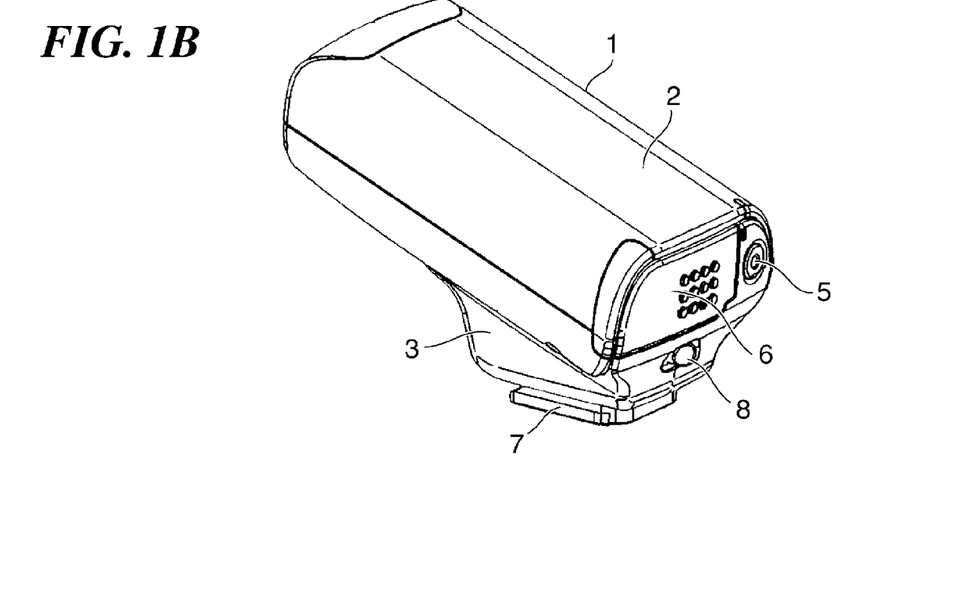
FIG. 1B is a perspective view of the appearance of the flash device in FIG. 1A, as viewed from the rear.
Figure 2A:
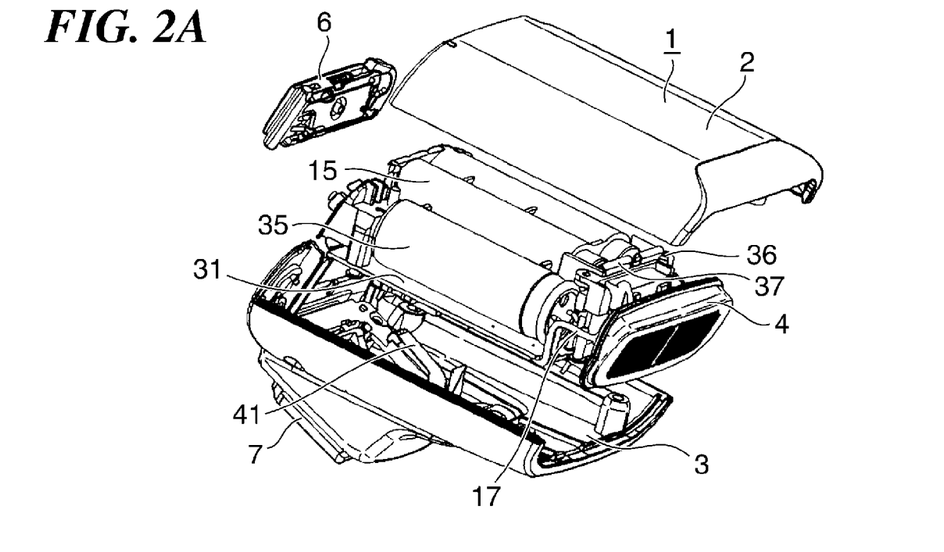
FIG. 2A is an exploded perspective view of the flash device in FIG. 1A.
Figure 2B:
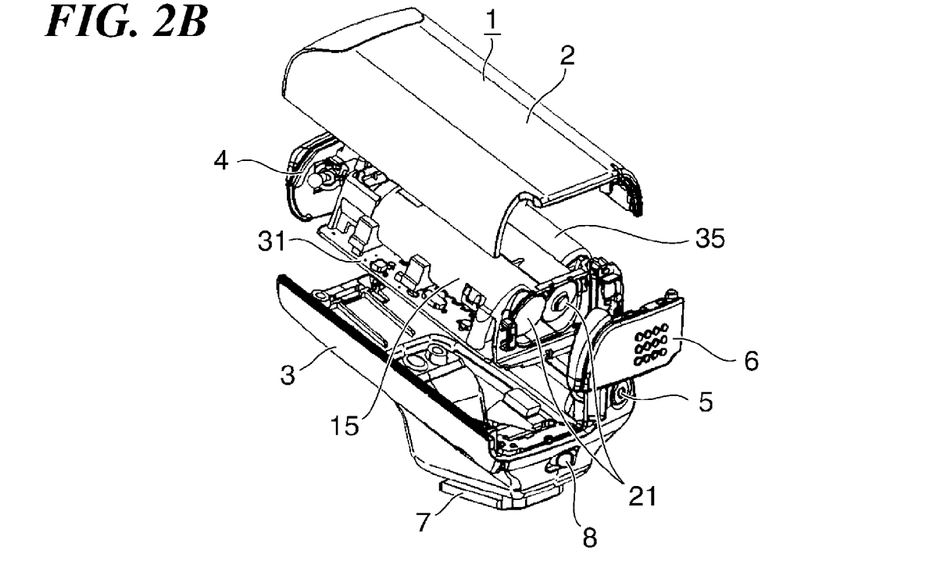
FIG. 2B is an exploded perspective view corresponding to FIG. 1B and showing the flash device, as viewed from the rear.

FIG. 1A is a perspective view of the appearance of a flash device as a light emitting device according to a first embodiment of the present invention, and FIG. 1B is a perspective view of the appearance of the flash device in FIG. 1A, as viewed from the rear of the same. FIG. 2A is an exploded perspective view of FIG. 1A, and FIG. 2B is an exploded perspective view of FIG. 1B. Note that in the present embodiment, the flash device is detachably attached to an external apparatus, such as a digital camera or the like image pickup apparatus, or a communication apparatus.

As shown in FIGS. 1A and 1B and FIGS. 2A and 2B, the flash device of the present embodiment comprises a device body 1 and a leg part 7 mounted to the bottom of the device body 1. The leg part 7 is detachable from a connection part of an external apparatus, such as a camera-side accessory shoe 50 (see FIG. 10). In a state where the leg part 7 is attached to the camera-side accessory shoe 50, elastic contact pins 54 (see FIG. 10) are held in contact with the camera-side accessory shoe 50 for electrical connection, whereby communication between the flash device and an associated camera body, not shown, is enabled.

The device body 1 has an exterior thereof formed by an upper cover 2 and a lower cover 3. The leg part 7 is attached to the bottom surface of the lower cover 3, and a lock switch 8 for preventing the device body 1 from falling off a camera and a power button 5 are provided on an end of the lower cover 3 on a rear side of the device body 1. Further, a holding member 51 (see FIG. 9) is fixed to the lower cover 3 e.g. with screws.

Inside the device body 1, there are arranged a circuit board 31, a battery 21, terminals and like elements for communication with a camera, the above-mentioned contact pins 54, and a communication-controlling shoe flexible printed circuit board 41 having a circuit mounted thereon for controlling communication with the camera-side accessory shoe 50. The shoe flexible printed circuit board 41 electrically connects between the contact pins 54 and a connector 42 (see FIG. 4) mounted on the circuit board 31. Further, a light emission section 4 for emitting flash light is disposed at a front-side (object-side) end of the device body 1, and a battery lid 6 is openably and closably disposed at a rear-side end of the device body 1.

The device body 1 of the flash device has a shape inclined with respect to a mounting surface of the camera such that an light emission section-side end of the device body 1 is positioned upward. The device body 1 is thus inclined so as to reduce the entire thickness of the flash device and improve portability of the same. Further, the light emission section 4 is required to be positioned at such a height as will prevent vignetting of the photographic lens of the camera having the flash device attached thereto.

For example, assuming that the device body 1 is disposed horizontally with respect to the mounting surface of the camera, this requires the leg part 7 to be extended so as to secure the height of the light emission section 4. As a consequence, the entire thickness of the flash device is increased, causing degradation of the portability of the flash device when it is single in a detached state.

Since the device body 1 has an inclined shape, the flash device of the present embodiment is realized as a small-sized flash device very excellent in portability both in a state detached from a camera and in a state attached to the camera.

Figure 3:
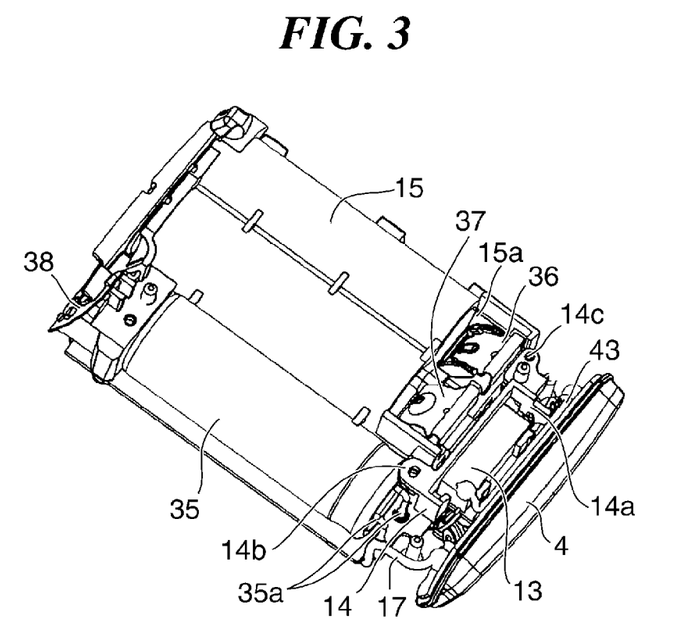
FIG. 3 is a perspective view of an internal structure of the device body of the flash device, as viewed from a side opposed to an upper cover.
Figure 4:
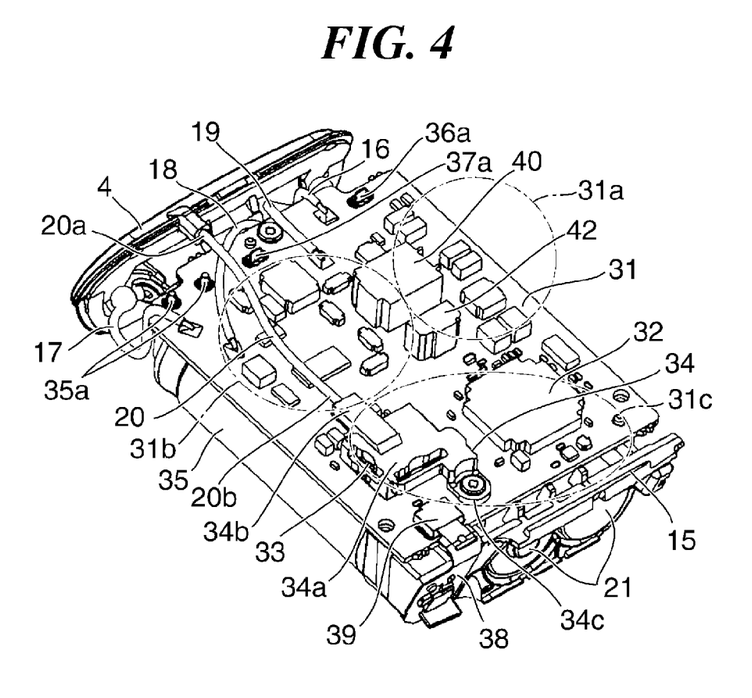
FIG. 4 is a perspective view of the internal structure of the device body of the flash device, as viewed from a side opposed to a lower cover.
Figure 5:
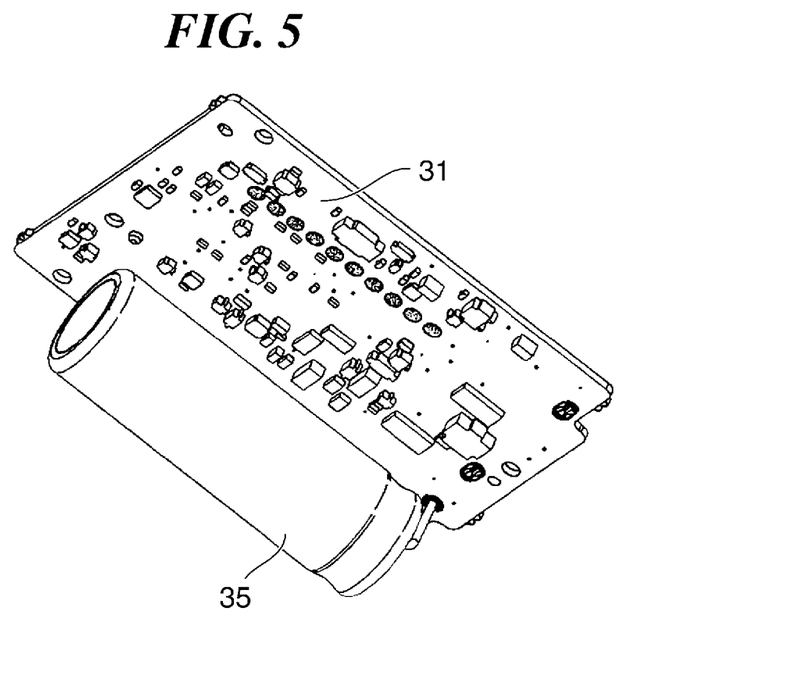
FIG. 5 is a perspective view of a circuit board as viewed from a surface facing toward the upper cover.
Figure 6:
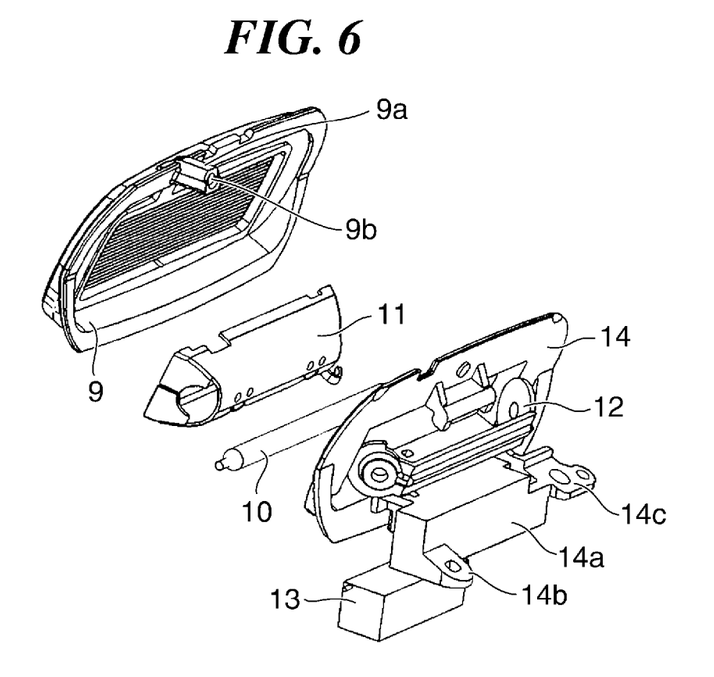
FIG. 6 is an exploded perspective view of a light emission section.

Next, the internal structure of the device body 1 of the flash device will be described in more detail with reference to FIGS. 3 to 6. FIG. 3 is a perspective view of an internal structure of the device body 1, as viewed from a side (upper surface side) opposed to the upper cover 2, and FIG. 4 is a perspective view of the internal structure, as viewed from a side (lower surface side) opposed to the lower cover 3. FIG. 5 is a perspective view of the circuit board 31 as viewed from a surface side facing toward the upper cover 2, and FIG. 6 is an exploded perspective view of the light emission section 4, as viewed from the same direction as in FIG. 4.

As shown in FIGS. 3 and 4, a battery case 15 has cylindrical battery-housing parts 15a that house respective two batteries 21. Battery contact pieces 36 and 37 are held at the light emission section-side end of the battery case 15, and terminal portions 36a and 37a of the respective battery contact pieces 36 and 37 are fixed to the circuit board 31 e.g. by soldering.

At the battery lid-side end of the battery case 15, there is disposed a power supply flexible printed circuit board 38 on which is mounted a detection switch for detecting the ON/OFF state of the power button 5. The power supply flexible printed circuit board 38 is electrically connected to a connector 39 mounted on the circuit board 31.

The circuit board 31 is configured as a multilayer circuit board having four or more layers, and is disposed at the rear side of the light emission section 4 in a manner extending along a direction intersecting with an emission surface of flash light (i.e. a panel surface of a Fresnel panel 9, described hereinafter) of the light emission section 4. The circuit board 31 is fixed to the lower surface of the battery case 15 e.g. with screws.

The circuit board 31 has a first flash circuit 31a (first circuit) including a booster transformer 40. Further, the circuit board 31 has a second flash circuit 31b (second circuit) for causing the light emission section 4 to emit light using energy of a main capacitor 35 charged by the battery 21. Furthermore, the circuit board 31 has a third flash circuit 31c (third circuit) including a control circuit for a digital system, on which are mounted a control CPU 32 and a light receiving sensor IC 33.

With the above-described construction, the circuit board 31 has the first flash circuit 31a, the second flash circuit 31b, and the third flash circuit 31c mounted on its surface disposed in a manner inclined such that an end thereof close to the light emission section 4 is positioned at a higher level than an end thereof remote from the light emission section 4.

The first flash circuit 31a and the second flash circuit 31b are disposed close to each other and close to the rear surface of the light emission section 4 such that connection distances between these and lead wires 16 to 19 led out from the light emission section 4 are made as short as possible so as to obtain excellent electrical efficiency.

In general, when electrical noise generated by a light emission section during flash light emission enters the communication line of a control IC, a communication error can occur, causing a malfunction in which an appropriate amount of light cannot be emitted. In the present embodiment, the third flash circuit 31c on which the control CPU 32 and the light receiving sensor IC 33 are mounted is disposed at a location more remote from the light emission section 4 than the first flash circuit 31a and the second flash circuit 31b are, so as to prevent occurrence of a malfunction due to noise generated by the light emission section during flash light emission. In short, the third flash circuit 31c on which the control CPU 32 and the light receiving sensor IC 33 are mounted is disposed closer to the end of the circuit board 31 remote from the light emission section 4 than the end of the circuit board 31 close to the light emission section 4. Further, the first flash circuit 31a, the control CPU 32, and the light receiving sensor IC 33 are disposed in the following positional relation: The first flash circuit 31a and the control CPU 32 are disposed such that they are not aligned in a direction parallel to the emission surface of the light emission section 4. The control CPU 32 is disposed at a location more remote from the light emission section 4 in the direction intersecting with the emission surface of the light emission section 4 than the first flash circuit 31a is. The first flash circuit 31a and the light receiving sensor IC 33 are disposed such that they are not aligned in the direction parallel to the emission surface of the light emission section 4. The light receiving sensor IC 33 is disposed at a location more remote from the light emission section 4 in the direction intersecting with the emission surface of the light emission section 4 than the first flash circuit 31a is. The first flash circuit 31a and the light receiving sensor IC 33 are disposed such that they are not aligned in the direction intersecting with the emission surface of the light emission section 4.

The battery case 15 is disposed on the surface (upper surface) of the circuit board 31 which faces toward the upper cover 2, and the first flash circuit 31a, the second flash circuit 31b, and the third flash circuit 31c are disposed on the surface (lower surface) of the circuit board 31 which faces toward the lower cover 3.

Now, a description will be given, with reference to FIG. 7, of a second-layer ground pattern of the circuit board 31. A ground layer and a power supply layer of the circuit board 31 as a multilayer circuit board having four or more layers are disposed as a second layer and a third layer, respectively, so as to prevent electrical noise generated by the light emission section 4 during flash light emission therefrom from affecting the output of the control CPU 32 and that of the light receiving sensor IC 33. In short, the ground layer and the power supply layer are formed as adjacent layers different from each other.

Figure 7:
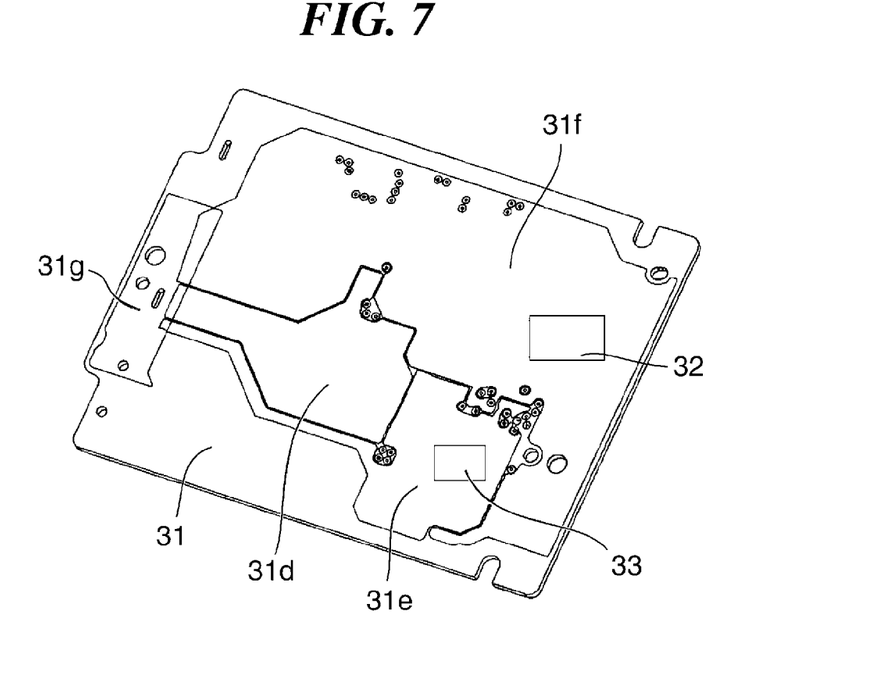
FIG. 7 is a perspective view showing a ground pattern on a second layer of the circuit board.

As shown in FIG. 7, the ground layer as the second layer of the circuit board 31 has an analog ground pattern 31e, a digital ground pattern 31f, and a power supply ground pattern 31d. The patterns 31e, 31f, and 31d are electrically connected to each other by a connection ground pattern 31g. This means that the patterns 31e, 31f, and 31d are electrically connected to each other in the vicinity of the end of the circuit board 31 close to the light emission section 4.

The digital ground pattern 31f is formed on an inner layer under the control CPU 32, and the analog ground pattern 31e is formed on an inner layer under the light receiving sensor IC 33. Further, the power supply ground pattern 31d is formed on an inner layer under electrical components, not shown, of a power supply system, not shown. In the present embodiment, the digital ground pattern 31f corresponds to an example of a first ground pattern of the present invention, and the analog ground pattern 31e corresponds to an example of a second ground pattern of the present invention. Further, the control CPU 32 corresponds to an example of a first control section of the present invention, and the light receiving sensor IC 33 corresponds to an example of a second control section of the present invention.

The three ground patterns 31f, 31e, and 31d are connected to each other as the same ground, but are different in the value of flowing electric current, which produces a potential difference. For this reason, in order to avoid a circuit malfunction, it is desirable to form the power supply ground pattern 31d at a location as remote as possible from the control CPU 32 and the light receiving sensor IC 33. In FIG. 7, the power supply ground pattern 31d is disposed between the analog ground pattern 31e and the digital ground pattern 31f. Note that the power supply ground pattern 31d may be at least partially disposed between the patterns 31e and 31f.

Referring again to FIGS. 3 and 4, the upper surface of the circuit board 31 is partially opposed to the battery case 15, and the main capacitor 35, which has a cylindrical shape, is disposed on the upper surface of the circuit board 31, with its longitudinal direction substantially in parallel with a direction of insertion/removal of the battery 21 into/from the battery case 15. Therefore, the longitudinal direction of the circuit board 31 is held substantially in parallel with the longitudinal direction of the main capacitor 35. The main capacitor 35 accumulates electric power supplied from the battery 21 for light emission, and performs charging and discharging for flash light emission.

Terminal portions 35a of the main capacitor 35 are fixed to the circuit board 31 e.g. by soldering at locations close to the terminal portions 36a and 37a of the respective battery contact pieces 36 and 37. This makes it possible to shorten electrical paths between the main capacitor 35 and the battery contact pieces 36 and 37 to thereby reduce electrical loss.

In the present embodiment, between the circuit board 31 and the battery case 15, there is formed a housing space for housing a plurality of electrical components (see FIG. 5) mounted on the upper surface of the circuit board 31.

The electrical components mounted on the upper surface of the circuit board 31 are configured to be smaller in volume than the control CPU 32 and the light receiving sensor IC 33 mounted on the lower surface of the circuit board 31. This makes it possible to arrange the electrical components space-efficiently without making useless space within the device body 1.

The light receiving sensor IC 33 is a sensor for receiving light guided from the light emission section 4 via a glass fiber cable 20. The light receiving sensor IC 33 is covered by a light receiving sensor-holding member 34 for being shielded from external light. The light receiving sensor-holding member 34 comprises a body portion 34a, a flash light emission section 34b, and a mounting portion 34c, which are integrally formed with each other.

The body portion 34a is fitted on the light receiving sensor IC 33 in a manner covering its entirety for shielding the same from external light. The body portion 34a is pressed by an elastic member 60 (see FIGS. 8 and 10) bonded to a presser portion 51d of the holding member 51, whereby when the device body 1 receives an impact e.g. due to a drop or a shake, the impact is absorbed by the elastic member 60 and breakage of the light receiving sensor IC 33 is prevented. The flash light emission section 34b holds an end 20b of the glass fiber cable 20 e.g. via adhesive. The mounting portion 34c is fixed to the battery case 15 together with the circuit board 31 with screws.

As shown in FIG. 6, the light emission section 4 comprises the Fresnel panel 9, a reflector 11, a xenon tube 10, a presser rubber 12, a trigger coil 13, and a flash holding member 14. The reflector 11 reflects flash light emitted from the xenon tube 10, to thereby guide the flash light to the Fresnel panel 9. The Fresnel panel 9 has a function of passing the flash light emitted from the xenon tube 10 and the light reflected by the reflector 11.

The xenon tube 10 is connected to the circuit board 31 via the lead wires 16 and 17 (see FIG. 4), and the trigger coil 13 is connected to the circuit board 31 via the lead wires 18 and 19 (see FIG. 4). The presser rubber 12 holds the xenon tube 10 in a state biasing the same toward the reflector 11.

The xenon tube 10, the reflector 11, and the presser rubber 12 are integrated in the flash holding member 14. Further, the flash holding member 14 is integrally formed with a housing part 14a that houses the trigger coil 13. A light emission trigger signal output from the trigger coil 13 is directly applied to the reflector 11 via a lead wire 43 (see FIG. 3).

The Fresnel panel 9 is integrally formed with a flash light entering portion 9a for guiding flash light emitted from the xenon tube 10 to the light receiving sensor IC 33 mounted on the circuit board 31, via the glass fiber cable 20. The flash light entering portion 9a is formed with a mounting hole 9b, and an end 20a of the glass fiber cable 20 is inserted into the mounting hole 9b and fixed e.g. by adhesive, as mentioned hereinabove.

More specifically, flash light emitted from the xenon tube 10 is guided to the light receiving sensor IC 33 via the flash light entering portion 9a, the glass fiber cable 20, and the flash light emission section 34b. The light receiving sensor IC 33 detects the amount of light emitted from the xenon tube 10, and then light emission amount control is performed by the control CPU 32 based on the detected light amount.

The light emission section 4 is positioned and held by fixing mounting portions 14b and 14c integrally formed with the flash holding member 14 to the upper cover 2 together with the battery case 15 e.g. with screws. The battery lid 6 and the lower cover 3 are also mounted to the upper cover 2.

Figure 8:
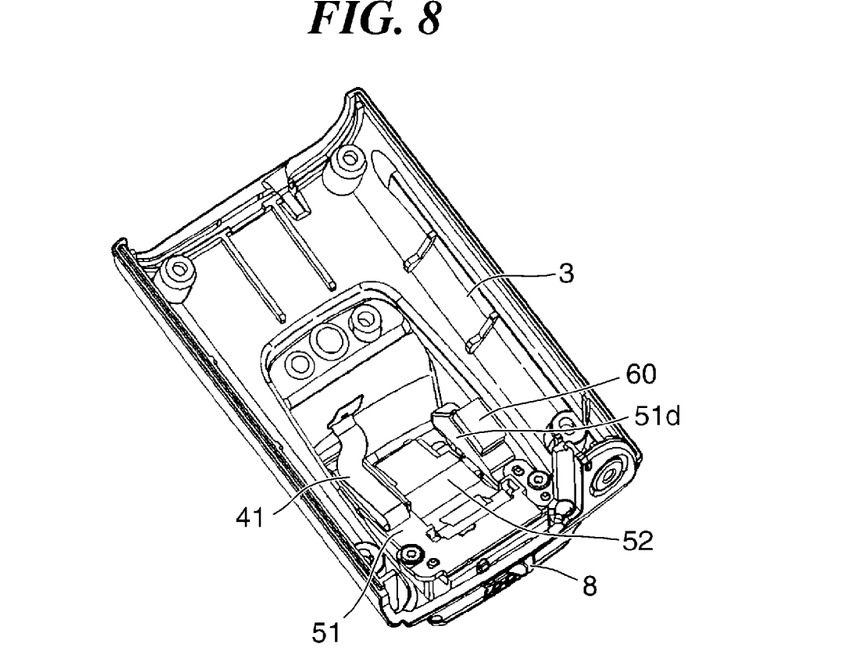
FIG. 8 is a perspective view of the lower cover as viewed from inside.
Figure 9:
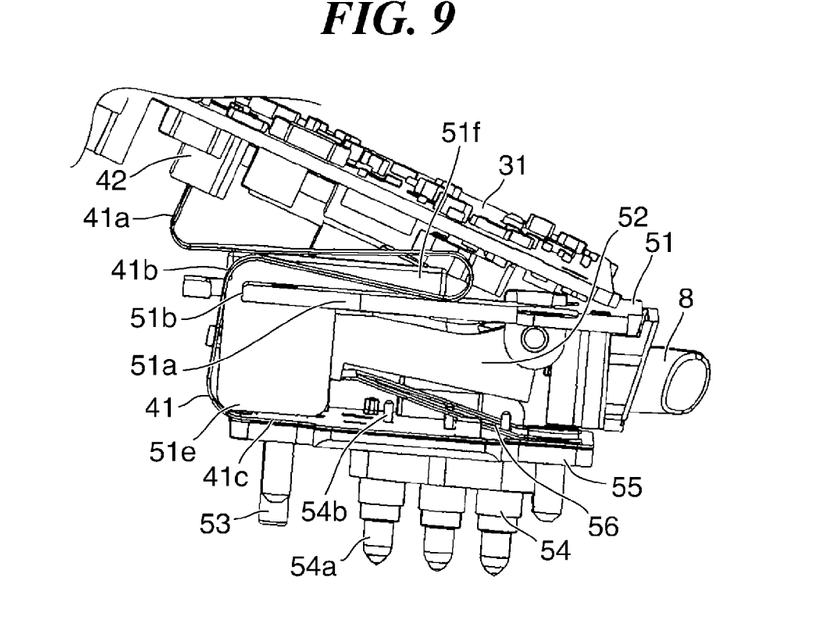
FIG. 9 is a view of an internal structure of a leg part.
Figure 10:
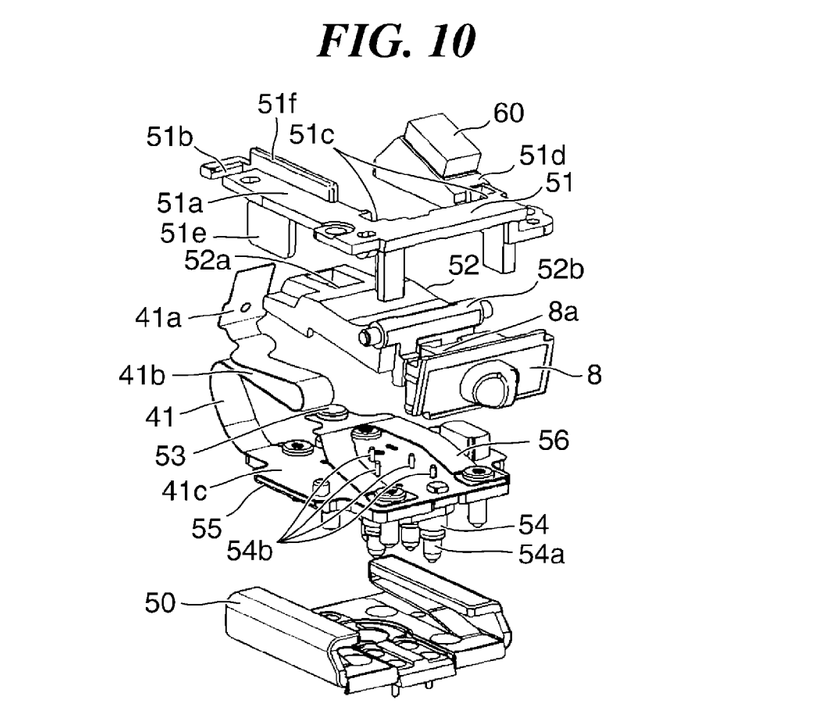
FIG. 10 is an exploded perspective view of the internal structure of the leg part.
Figure 11:
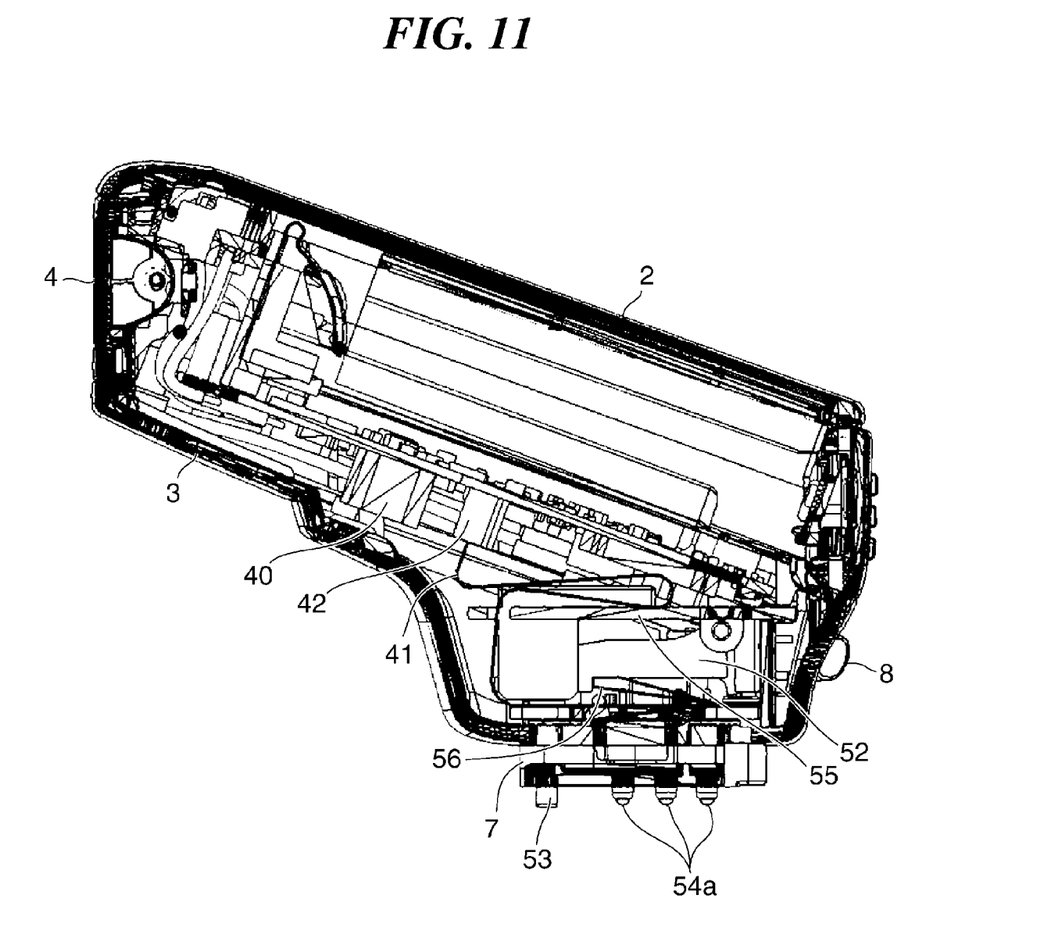
FIG. 11 is a side cross-sectional view of the flash device.

FIG. 8 is a perspective view of the lower cover 3 as viewed from inside. FIG. 9 is a view of an internal structure of the leg part 7. FIG. 10 is an exploded perspective view of the internal structure of the leg part 7. FIG. 11 is a side cross-sectional view of the flash device.

Referring to FIGS. 8 to 11, each of the contact pins 54 has a lower end thereof formed as a contact portion 54a, and the contact portion 54a is configured to be axially movable in press contact with the camera-side accessory shoe 50. Further, each of the contact pins 54 has an upper end thereof formed with a soldered portion 54b directly electrically conductive with a base portion 41c of the shoe flexible printed circuit board 41.

A heat-resistant member 55 is a molded article formed e.g. of a heat-resistant molding material. The base portion 41c of the shoe flexible printed circuit board 41 is disposed on the upper surface of the heat-resistant member 55. The soldered portion 54b of each of the contact pins 54 is inserted through an associated one of through holes, not shown, formed in the heat-resistant member 55, and is directly soldered to the base portion 41c of the shoe flexible printed circuit board 41, whereby the contact pins 54 and the heat-resistant member 55 are formed into a unit.

A biasing member 56 is disposed on the upper surface of the base portion 41c of the shoe flexible printed circuit board 41, and a lock pin 53 is provided at a front end of the biasing member 56. The lock pin 53 is configured to be movable from an unlocked position where the flash device is unlocked from the camera-side accessory shoe 50 to a locked position where the flash device is locked to the camera-side accessory shoe 50. The lock pin 53 is biased by the biasing member 56 toward the unlocked position so as to prevent the lock pin 53 from protruding from the bottom surface of the leg part 7 in the unlocked state. The biasing member 56 is held by the lower cover 3 as an exterior member in a manner fixed to the same together with the base portion 41c of the shoe flexible printed circuit board 41, the heat-resistant member 55, and the contact pins 54, e.g. with screws.

The lock switch 8 is operated by a user to move the lock pin 53 between the unlocked position and the locked position. The lock switch 8 is provided with a click part 8a, and a lock lever 52 is engaged with the click part 8a. The lock lever 52 is formed with a fitting portion 52a in which the lock pin 53 is fitted. Further, the lock lever 52 is supported via a shaft portion 52b thereof in a support portion 51c formed in the holding member 51 such that the lock lever 52 can be pivotally moved in a direction (axial direction) in which the lock pin 53 moves.

When the lock switch 8 is operated by a user, the lock lever 52 pivotally moves about the support portion 51c of the holding member 51 in accordance with sliding of the lock lever 52 with respect to the click part 8a, whereby the lock pin 53 moves between the unlocked position and the locked position in unison with the fitting portion 52a.

The shoe flexible printed circuit board 41 comprises the base portion 41c, an extended portion 41b extended from the base portion 41c, and a connector portion 41a formed on the front end of the extended portion 41b. The connector portion 41a is electrically connected to the connector 42 mounted on the circuit board 31. The extended portion 41b is formed into a long slender shape smaller in width than the base portion 41c.

The extended portion 41b is bent upward from a front end (light emission section-side end) of the base portion 41c along an R-shaped portion of a guide portion 51e of the holding member 51. Then, after being inserted through a cutout 51b of the holding member 51, the extended portion 41b is bent rearward such that the extended portion 41b is opposed to the base portion 41c, and then guided to a guide portion 51a of the holding member 51. In this state, the cutout 51b and the guide portion 51e also have a function of regulating positional deviation of the extended portion 41b in front-rear and vertical directions.

Further, since the lock lever 52 pivotally moves between the guide portion 51a and the presser portion 51d of the holding member 51, a partition wall 51f for partitioning between the lock lever 52 and the extended portion 41b is formed on a lateral side of the guide portion 51a toward the presser portion 51d. This makes it possible to prevent the extended portion 41b from interfering with the lock lever 52 due to positional deviation of the extended portion 41b during the pivotal motion of the lock lever 52.

After having been guided to the guide portion 51a, the extended portion 41b is bent forward, whereby the connector portion 41a is electrically connected to the connector 42 mounted on the circuit board 31. At this time, the connector portion 41a is electrically connected to the connector 42 substantially at right angles with respect to the circuit board 31. This makes it possible to prevent interference between the connector portion 41a and components mounted around the connector 42, so that the degree of freedom in layout of the mounted components is enhanced, which makes it possible to reduce the size of the circuit board 31.

As described above, according to the present embodiment, the first flash circuit 31a including the booster circuit, the second flash circuit 31b including the high-voltage circuit for causing light emission of the light emission section 4, and the third flash circuit 31c including the control circuit for the digital system are arranged on one surface of the circuit board 31. Further, the third flash circuit 31c is disposed at a location more remote from the light emission section 4 than the first flash circuit 31a and the second flash circuit 31b are. This makes it possible to arrange the electrical components and the circuit board, with high space efficiency, such that a malfunction caused by noise from the light emission section can be reduced, to thereby achieve further size reduction and high multifunctionality of the flash device. Further, on the other surface of the circuit board 31, the main capacitor 35 and the battery case 15 are disposed in parallel with each other, and a plurality of relatively small electrical components are arranged in a space formed between the circuit board 31 and the battery case 15. This makes it possible to arrange the electrical components and the circuit board 31 more space-efficiently to thereby achieve further size reduction and high multifunctionality of the flash device.

In the present embodiment, the ground layer and the power supply layer of the circuit board 31 which is a multilayer circuit board having four or more layers are formed as layers different from each other, and the ground layer comprises the analog ground pattern 31e, the digital ground pattern 31f, and the power supply ground pattern 31d, which are connected to each other by the connection ground pattern 31g. This makes it possible to effectively suppress entrance of high-frequency noise generated by the digital circuit into the analog circuit.

Further, in the present embodiment, the digital ground pattern 31f is formed on the inner layer under the control CPU 32, the analog ground pattern 31e is formed on the inner layer under the light receiving sensor IC 33, and the power supply ground pattern 31d is formed on the inner layer under the electrical components of the power supply system. This makes it possible to prevent electrical noise generated by the light emission section 4 during flash light emission from affecting output from the control CPU 32 and output from the light receiving sensor IC 33.

Although in the above-described embodiment, the ground layer comprises the three ground patterns by way of example, the ground layer may comprise two ground patterns, i.e. the analog ground pattern 31e or the digital ground pattern 31f, and the power supply ground pattern 31d.

Further, although in the above-described embodiment, the control CPU 32 and the light receiving sensor IC 33 are arranged on the same surface of the circuit board 31 by way of example, the circuit board 31 may have the control CPU 32 disposed on one surface thereof and the light receiving sensor IC 33 disposed on the other surface thereof.

In the present embodiment, the shoe flexible printed circuit board 41 electrically connecting between the contact pins 54 and the connector 42 mounted on the circuit board 31 is guided and regulated in position by the guide portions 51a and 51e, the partition wall 51f, and the cutout 51b of the holding member 51. This makes it possible to prevent the shoe flexible printed circuit board 41 from interfering with other components when the device body 1 receives an impact due to a drop or a shake, and minimize influence of such an external force. Further, fitting between the connector portion 41a and the connector 42 is stabilized, which makes it possible to maintain reliability in electrical connection.

Further, since a space is created in a portion surrounded by the lower cover 3, the circuit board 31, and the shoe flexible printed circuit board 41, it is possible to house a plurality of electrical components in the space, as shown in FIG. 7. As a consequence, a plurality of electrical components can be space-efficiently arranged in the device body 1, which makes it possible to achieve further multifunctionality of the flash device.

Furthermore, since the shoe flexible printed circuit board 41 is regulated in position by the holding member 51 in a state bent at a plurality of portions thereof within the device body 1, the shoe flexible printed circuit board 41 can be space-efficiently disposed in the device body 1 without producing a useless space, which makes it possible to achieve size reduction of the flash device.

Moreover, since the multifunctionality of the flash device can be achieved without increasing the number of circuit boards, it is possible to avoid an increase in costs due to an increase in the number of dedicated connection members, such as lead wires, wire harnesses, and relay flexible boards, which connect between circuit boards.

Figure 12:
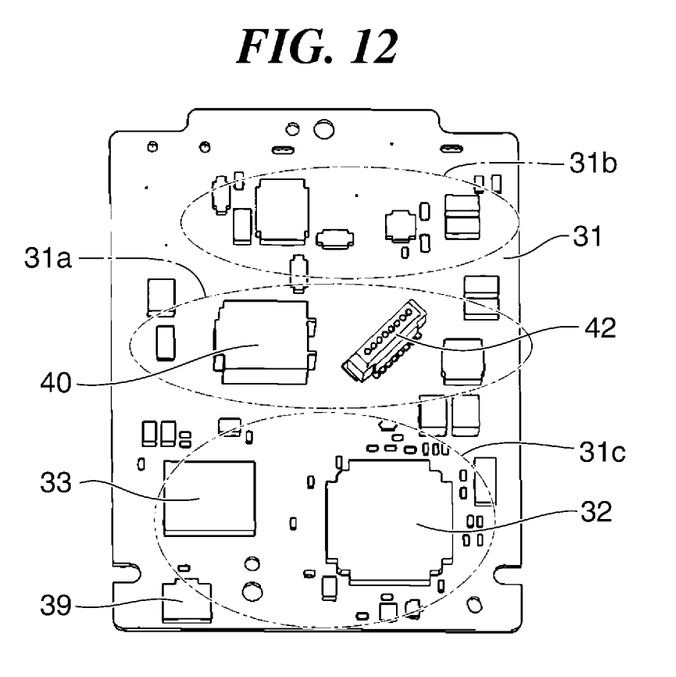
FIG. 12 is a plan view of a circuit board of a flash device according to a second embodiment of the present invention, as viewed from a surface facing toward a lower cover.

Next, a description will be given, with reference to FIG. 12, of a flash device as a light emitting device according to a second embodiment of the present invention. Note that only different points from the above-described first embodiment will be described while denoting duplicate or corresponding portions of the first embodiment by the same reference numerals as used in the first embodiment. FIG. 12 is a plan view of a circuit board 31 of the flash device, as viewed from the lower surface side.

As shown in FIG. 12, the circuit board 31 has a first flash circuit 31a including a booster transformer 40, and a second flash circuit 31b for causing a light emission section 4 to emit light using energy of a main capacitor 35 charged by a battery 21. Further, the circuit board 31 has a third flash circuit 31c including a control circuit for a digital system, on which are mounted a control CPU 32 and a light receiving sensor IC 33.

The second flash circuit 31b is disposed at a location closest to the light emission section 4 such that connection distances between the second flash circuit 31b and the respective lead wires 16 to 19 led out from the light emission section 4 are made as short as possible so as to obtain excellent electrical efficiency. On the other hand, the first flash circuit 31a is disposed at a location more remote from the light emission section 4 than the second flash circuit 31b is, and the third flash circuit 31c is disposed at a location more remote from the light emission section 4 than the first flash circuit 31a is.

Further, in order to prevent occurrence of a malfunction due to noise generated by the light emission section during flash light emission, the third flash circuit 31c on which are mounted the control CPU 32 and the light receiving sensor IC 33 is disposed at a location more remote from the light emission section 4 than the first flash circuit 31a and the second flash circuit 31b are.

In the present embodiment, the connection distances between the second flash circuit 31b and the respective lead wires 16 to 19 led out from the light emission section 4 are shorter than in the first embodiment, so that more excellent electrical efficiency can be obtained. The other configuration and the advantageous effects are the same as those of the above-described first embodiment.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

For example, although in each of the above-described embodiments, it is assumed that the flash device is detachably attached to an image pickup apparatus, the flash device may be integrated in an image pickup apparatus.

This application claims priority from Japanese Patent Applications No. 2012-091859, filed Apr. 13, 2012, No. 2012-091860, filed Apr. 13, 2012, and No. 2012-123076, filed May 30, 2012 which are hereby incorporated by reference herein in their entirety.

What is claimed is:

1. A light emitting device comprising:
a light emission section; and
a circuit board disposed behind said light emission section in a manner extending in a direction intersecting with an emission surface of said light emission section,
wherein said circuit board has a first circuit including a booster circuit, a second circuit including a high voltage circuit for causing said light emission section to emit light, and a third circuit including a control circuit for a digital system, mounted thereon, and said third circuit is disposed at a location more remote from said light emission section than said first circuit and said second circuit are.

2. The light emitting device according to claim 1, wherein said first circuit, said second circuit, and said third circuit are mounted on one surface of said circuit board, and a capacitor that is charged with energy for causing light emission of said light emission section, and a battery case in which a battery for charging said capacitor with the energy is housed are disposed in a manner opposed to the other surface of said circuit board, and
wherein on the other surface of said circuit board, electrical components smaller in volume than said control circuit are mounted between said circuit board and said battery case.

3. The light emitting device according to claim 1, wherein said second circuit is disposed at a location closer to said light emission section than said first circuit is.

4. The light emitting device according to claim 2, wherein said capacitor is disposed such that a longitudinal direction of said capacitor is substantially parallel with the intersecting direction.

5. The light emitting device according to claim 2, wherein said capacitor is disposed such that a longitudinal direction of said capacitor is substantially parallel with directions of inserting and removing of the battery into and from said battery case.

6. The light emitting device according to claim 2, wherein a terminal portion of said capacitor is fixed to said circuit board at a location close to a terminal portion of said battery case fixed to said circuit board.

7. The light emitting device according to claim 1, wherein said circuit board has said first circuit, said second circuit, and said third circuit mounted on a surface thereof disposed in a manner inclined such that an end thereof close to said light emission section is positioned at a higher level than an end thereof remote from said light emission section.

8. The light emitting device according to claim 1, wherein said third circuit includes a light receiving sensor configured to detect an amount of light emitted from said light emission section.

9. A light emitting device comprising:
a light emission section; and
a circuit board disposed behind said light emission section in a manner extending in a direction intersecting with an emission surface of said light emission section and having a first control section mounted thereon,
wherein said circuit board is formed as a multilayer circuit board having four or more layers including a ground layer and a power supply layer formed as layers different from each other, and
wherein said ground layer has a first ground pattern and a power supply ground pattern,
said first ground pattern being formed on an inner layer under said first control section, and said power supply ground pattern being formed on an inner layer under electrical components of a power supply system at a location remote from said first control section.

10. The light emitting device according to claim 9, wherein said first control section is disposed on said circuit board at a location closer to an end of said circuit board remote from said light emission section than an end of said circuit board close to said light emission section.

11. The light emitting device according to claim 9, wherein said first ground pattern and said power supply ground pattern are electrically connected to each other at a location close to an end of said circuit board close to said light emission section.

12. The light emitting device according to claim 9, wherein said circuit board has a second control section mounted thereon at a location remote from said power supply ground pattern, and wherein said ground layer has a second ground pattern, and said second ground pattern is formed on an inner layer under said second control section.

13. The light emitting device according to claim 12, wherein said first ground pattern is a digital ground pattern, and said second ground pattern is an analog ground pattern.

14. The light emitting device according to claim 12, wherein said second control section is disposed on said circuit board at a location closer to an end of said circuit board remote from said light emission section than an end of said circuit board close to said light emission section.

15. The light emitting device according to claim 12, wherein said second ground pattern and said power supply ground pattern are electrically connected to each other at a location close to an end of said circuit board close to said light emission section.

16. The light emitting device according to claim 12, wherein said power supply ground pattern is at least partially disposed between said first ground pattern and said second ground pattern.

17. The light emitting device according to claim 9, wherein said ground layer and said power supply layer of said circuit board are adjacent to each other.

18. A light emitting device comprising:
a light emission section;
a circuit board on which are mounted a plurality of electrical components for controlling light emission of said light emission section;
contact pins configured to be electrically connected to a connection part of an external apparatus;
a flexible circuit board configured to electrically connect between said contact pin and said circuit board; and
a holding member disposed between said contact pins and said circuit board, said holding member including a plurality of guide portions for guiding said flexible circuit board and being configured to regulate a position of said flexible circuit board by said guide portions,
wherein said flexible circuit board has a base portion fixed to an exterior member together with said contact pins, an extended portion extended from said base portion, and a connector portion formed on a front end of said extended portion for electrical connection to a connector mounted on said circuit board, and said extended portion is regulated in position by said holding member.

19. The light emitting device according to claim 18, wherein said guide portions include a cutout through which said extended portion is inserted.

20. The light emitting device according to claim 18, wherein said extended portion is smaller in width than said base portion.

21. The light emitting device according to claim 18, wherein said extended portion is regulated in position by said holding member in a state bent at a plurality of portions thereof, and is also bent between said holding member and said circuit board.

22. The light emitting device according to claim 18, wherein said connector portion of said flexible circuit board is perpendicularly connected to said connector mounted on said circuit board.

23. The light emitting device according to claim 18, wherein said contact pins are directly soldered to said base portion of said flexible circuit board.

24. The light emitting device according to claim 18, wherein a heat-resistant member is disposed between said base portion of said flexible circuit board and said contact pins.

25. The light emitting device according to claim 18, wherein said holding member is provided with a presser portion for pressing the electrical components mounted on said circuit board, via an elastic member.

26. A light emitting device comprising:
a light emission section;
a circuit board disposed behind said light emission section in a manner extending in a first direction intersecting with an emission surface of said light emission section;
a booster section configured to boost voltage applied to said light emission section so as to cause said light emission section to emit light; and
a control section configured to control said light emission section,
wherein said booster section and said control section are mounted on the same surface of said circuit board,
wherein said booster section and said control section are disposed such that said booster section and said control section are not aligned in a second direction parallel to the emission surface of said light emission section, and
wherein said control section is disposed at a location more remote from said light emission section in the first direction than said booster section is.

27. The light emitting device according to claim 26 further comprising:
a capacitor configured to accumulate electric energy for use in causing said light emission section to emit light,
wherein said capacitor is disposed in a manner opposed to a surface of said circuit board different from the surface thereof on which said booster section and said control section are mounted.

28. The light emitting device according to claim 26 further comprising:
a light receiving sensor configured to detect an amount of light emitted from said light emission section,
wherein said booster section and said light receiving sensor are mounted on the same surface of said circuit board,
wherein said booster section and said light receiving sensor are disposed such that said booster section and said light receiving sensor are not aligned in the second direction, and
wherein said light receiving sensor is disposed at a location more remote from said light emission section in the first direction than said booster section is.

29. The light emitting device according to claim 26, wherein said booster section and said light receiving sensor are disposed such that said booster section and said light receiving sensor are not aligned in the first direction.

* * * * *